United States Patent
Stahl

(10) Patent No.: US 9,873,323 B2
(45) Date of Patent: Jan. 23, 2018

(54) PRESSURE VESSEL FOR A MOTOR VEHICLE

(71) Applicant: Bayerische Motoren Werke Aktiengesellschaft, Munich (DE)

(72) Inventor: Hans-Ulrich Stahl, Munich (DE)

(73) Assignee: Bayerische Motoren Werke Aktiegesellschaft, Munich (DE)

( * ) Notice: Subject to any disclaimer, the term of this patent is extended or adjusted under 35 U.S.C. 154(b) by 0 days.

(21) Appl. No.: 15/071,615

(22) Filed: Mar. 16, 2016

(65) Prior Publication Data

US 2016/0272103 A1    Sep. 22, 2016

(30) Foreign Application Priority Data

Mar. 17, 2015  (DE) .................. 10 2015 204 831
Apr. 15, 2015  (DE) .................. 10 2015 206 825
Apr. 15, 2015  (DE) .................. 10 2015 206 826

(51) Int. Cl.
   *B60K 15/07*    (2006.01)

(52) U.S. Cl.
   CPC ........... *B60K 15/07* (2013.01); *B60Y 2306/01* (2013.01)

(58) Field of Classification Search
   CPC ................... B60K 15/07; B60K 2015/0675
   See application file for complete search history.

(56) References Cited

U.S. PATENT DOCUMENTS

| 6,830,226 B2 * | 12/2004 | Field ................. A62C 13/78 248/313 |
| 7,631,901 B2 * | 12/2009 | Diehl ................ B60K 15/07 280/834 |
| 8,979,131 B2 * | 3/2015  | Schwark ............ B60K 15/07 248/635 |
| 2006/0113128 A1 | 6/2006 | Sato et al. |
| 2008/0023957 A1 | 1/2008 | Diehl |
| 2011/0143222 A1 | 6/2011 | Oelerich et al. |
| 2015/0001839 A1 | 1/2015 | Dandalides et al. |

FOREIGN PATENT DOCUMENTS

| DE |     1 186 895 B | 6/1963 |
| DE | 10 2005 056 345 A1 | 8/2006 |
| DE | 10 2007 034 299 A1 | 4/2008 |
| DE | 10 2010 053 874 A1 | 8/2011 |
| DE | 10 2012 011 612 A1 | 1/2013 |

(Continued)

OTHER PUBLICATIONS

English translation of previously submitted Document C2 (Japanese Office Action issued in counterpart Japanese Application No. 2016-053690 dated Jul. 4, 2016) originally filed Aug. 16, 2016 (4 pages).

(Continued)

*Primary Examiner* — Kevin Hurley
(74) *Attorney, Agent, or Firm* — Crowell & Moring LLP

(57) ABSTRACT

A pressure vessel is provided for a motor vehicle. The pressure vessel has a fastening apparatus. The fastening apparatus is designed to connect the pressure vessel to a body of the motor vehicle. The fastening apparatus has at least one connecting pin, which is displaceable relative to the body or relative to the pressure vessel, and at least one fixing mechanism. The fixing mechanism is designed to at least temporarily fixedly clamp the connecting pin.

19 Claims, 3 Drawing Sheets

(56) References Cited

FOREIGN PATENT DOCUMENTS

| | | |
|---|---|---|
| JP | 52-1123 | 6/1975 |
| JP | 2006-292031 A | 10/2006 |
| JP | 2011-226608 A | 11/2011 |

OTHER PUBLICATIONS

German Search Report issued in counterpart German Application No. 10 2015 206 825.0 dated Dec. 14, 2015, with partial English translation (seventeen (17) pages).
German-language Japanese Office Action issued in counterpart Japanese Application No. 2016-053690 dated Jul. 4, 2016 (4 pages).

* cited by examiner

PRESSURE VESSEL FOR A MOTOR VEHICLE

CROSS REFERENCE TO RELATED APPLICATIONS

This application claims priority under 35 U.S.C. §119 from German Patent Application No. 10 2015 204 831.4, filed Mar. 17, 2015, 10 2015 206 825.0, filed Apr. 15, 2015, and 10 2015 206 826.9, filed Apr. 15, 2015, the entire disclosure of which is herein expressly incorporated by reference.

This application contains subject matter related to U.S. application Ser. No. 15/071,633, entitled "Pressure Vessel for a Motor Vehicle" filed on even date herewith.

BACKGROUND AND SUMMARY OF THE INVENTION

The technology disclosed here relates, inter alia, to a pressure vessel for motor vehicles. The pressure vessel may be, for example, a cryogenic pressure vessel or a high-pressure gas vessel in which fuel is stored.

Pressure vessels expand in a manner dependent on factors such as the internal pressure p or the temperature T of the pressure vessel. For this reason, pressure vessels are attached to the body in accordance with the fixed bearing-floating bearing principle. From the prior art, bearing arrangements with pressure vessel expansion compensation are known, in the case of which the expansions of a pressure vessel in a radial direction R and in the direction of the pressure vessel longitudinal axis A-A are compensated by way of separate mechanisms. Such embodiments are relatively cumbersome and are therefore expensive. Moreover, they require a relatively large amount of structural space. Further, they are not capable of transmitting all forces and moments from one end of a pressure vessel to another end of the pressure vessel. For example, the previously known solutions are not capable, in the case of a pressure vessel arranged in the central tunnel of a motor vehicle, of transmitting forces in the direction of travel x in play-free fashion. Furthermore, moments about the vehicle transverse axis y and the vehicle vertical axis z cannot be transmitted in play-free fashion.

It is an object of the technology disclosed here to reduce or eliminate the disadvantages of the previously known solutions. Further objects will emerge from the advantageous effects of the technology disclosed here. The object(s) is/are achieved by way of a pressure vessel for a motor vehicle, comprising: a fastening apparatus configured to connect the pressure vessel to a body of the motor vehicle, the fastening apparatus having: at least one connecting pin which is displaceable relative to the body or relative to the pressure vessel, and at least one fixing mechanism which is configured to at least temporarily fixedly clamp the connecting pin.

The technology disclosed here relates to a pressure vessel for storing fuel for a motor vehicle. A pressure vessel of this type may be, for example, a cryogenic pressure vessel or a high-pressure gas vessel. The pressure vessel may be used in a motor vehicle which is operated, for example, with compressed natural gas (CNG) or with hydrogen (fuel cell electrical vehicle). The cryogenic pressure vessel may store fuel preferably in the liquid or supercritical state of aggregation. The fuel may be stored in the cryogenic pressure vessel for example at temperatures of approximately 30 K to 360 K. High-pressure gas vessels are preferably designed to store fuel permanently at a pressure of over approximately 350 bar(g), more preferably of over approximately 500 bar(g), and particularly preferably of over approximately 700 bar(g).

The pressure vessel includes a fastening apparatus, wherein the fastening apparatus is designed to connect the pressure vessel, at one side of the pressure vessel, to a body of the motor vehicle. Here, a part of the body is to be understood to mean any suitable structure of the motor vehicle to which the pressure vessel can be fastened. For example, the at least one pressure vessel of the motor vehicle may be arranged in the central tunnel. Furthermore, however, the pressure vessel may also be accommodated elsewhere, for example under the rear seats.

The fastening apparatus may have, on one side or on one end of the pressure vessel, at least two connecting pins which may each be connected, in particular rigidly, to the pressure vessel in a pressure vessel attachment region. The at least two connecting pins may extend away from the outer surface of the pressure vessel. The connecting pin may also be referred to as a connecting rod or connecting bolt. The connecting pin is preferably formed so as to be rigid or immovable relative to the pressure vessel or relative to the body.

The at least two connecting pins may each be guided or received in a bearing. The bearings or guides are particularly preferably suitable for permitting a relative displacement between the connecting pins and the bearings or guides. Furthermore, the bearings may preferably be fixing mechanisms such as are likewise disclosed here.

In each case one connecting pin may be connected to a bearing at a connecting point V.

Furthermore, as an alternative to the preceding refinement, the fastening apparatus may also, on one side or on one end of the pressure vessel, have at least two bearings which are each connected to the pressure vessel in a pressure vessel attachment region and which extend away from the outer surface of the pressure vessel. This aspect constitutes the kinematic reversal of the preceding aspect. Instead of the one or more bearings being arranged on the body, it is also possible for the one or more bearings to be arranged on the pressure vessel. The at least two connecting pins would then be arranged on, and connected to, the body. It is also possible for a combination (one bearing and one connecting pin) to be connected to the pressure vessel.

In the pressure vessel attachment regions, the pressure vessel may exhibit in each case an expansion E and/or expand in said direction E.

The connecting pin and the bearing can, in the connecting point V, be at least regionally shaped and arranged such that the expansion E is kinematically guided with only one translational degree of freedom by way of a movement of the bearing and/or of the connecting pin. The expansion E in the pressure vessel attachment region B is preferably thereby at least partially compensated. In other words, the expansion E causes a movement of the component (bearing or connecting pin) that is rigidly connected thereto. The component is, however, of such a form that it can follow the movement of the expansion E such that, as a result of the expansion E itself, no additional forces and/or moments, or only small additional forces and/or moments, are transmitted at the connecting point V to the further component of the fastening apparatus (corresponding connecting pin or bearing).

A movement of the bearing and/or of the connecting pin with only one translational degree of freedom means that, during the translational movement in space, the coordinates x, y and z of the movement are dependent on one another and cannot be varied independently of one another. The only one translational degree of freedom may be a movement along a straight or curved path. The exact profile of the path arises from the vessel geometry, the expansion behavior thereof and the arrangement of the bearings/connecting pins.

In the case of the technology disclosed here, all other degrees of freedom are restricted. In this way, it is possible for a greater number of force and/or moment components to be transmitted in play-free fashion along the vehicle axes than in the case of previously known solutions. Furthermore, such a suspension arrangement or fastening apparatus for a pressure vessel is easy to realize. It is preferable for four connecting pins to be provided on each side of the pressure vessel.

A special case is a linear or straight expansion E of the pressure vessel attachment region B. In the special case of a linear expansion E, wherein the angle α thus remains constant for all expansion states, the connecting pins are at least regionally straight, and the then constant expansion direction E may preferably be at least regionally collinear with respect to the longitudinal axis of the connecting pins and/or of the bearings. By virtue of the fact that the expansion E, that is to say the expansion caused, for example, by the change in pressure vessel internal pressure or temperature, is parallel to the longitudinal axis of the connecting pins, only a linear movement takes place at the connecting point V at each suspension point. It is thus possible for components of particularly simple construction to be used.

The expansion E may run collinearly, or with a slight offset, with respect to the axes of the connecting pins and/or of the bearings. If the longitudinal axes of the connecting pins and/or of the bearings are arranged offset with respect to the expansion E, for example with an offset toward the outside, it may be possible by way of such a structure for any moments to be transmitted in a more effective manner. For the most part, the special case of the parallel arrangement of the expansion E and the longitudinal axes of the bearings/connecting pins will be discussed below. The disclosed technology is, however, likewise applicable to translational movements with only one degree of freedom along curved paths.

The at least two connecting pins and/or the at least two bearings may be arranged so as to be angled with respect to one another. If the connecting pins and/or the at least two bearings are arranged so as to be angled with respect to one another—that is to say not parallel with respect to one another—it is possible for further forces and moments to be transmitted. If the connecting pins and/or the bearings were arranged parallel, it would not be possible for forces to be transmitted in play-free fashion in the direction of the collinear axis (for example of the pressure vessel longitudinal axis).

The longitudinal axes of the at least two connecting pins and/or of the at least two bearings may be arranged at an angle β with respect to one another, which angle lies between 2° and 178°, preferably between 5° and 90°, and particularly preferably between 10° and 50°. Depending on the design of the pressure vessel, the expansion E resulting from the pressure vessel loading may lie in these angle ranges. The resulting expansion E can be predicted in an effective manner in advance by way of simulations and tests.

The longitudinal axes of the at least two fastening pins and/or of the at least two bearings are preferably arranged so as to be angled, that is to say not parallel, with respect to the pressure vessel longitudinal axis A-A. A degree of freedom along the pressure vessel longitudinal axis A-A is then eliminated. The longitudinal axes of the at least two fastening pins and/or of the at least two bearings may be arranged at an angle α with respect to the longitudinal axis A-A of the pressure vessel, which angle lies between 2° and 178°, preferably between 5° and 90° and particularly preferably between 10° and 50°. If the pressure vessel is installed, for example, in the central tunnel, it is thus possible for forces to be transmitted in the vehicle longitudinal direction. This task is performed, in vehicle architectures that are common nowadays, by longitudinal members. If the tank now partially performs this task, it is possible for vehicle mass to be reduced, and/or for vehicle stiffness to be increased.

The bearings may be in the form of ball joints, in particular in the form of ball joints in which the connecting pins are received in displaceable fashion and which furthermore permit a rotation of the respective connecting pins, similarly to the situation, for example, in the case of ball joints in upper links of tractors. It is thus possible for the bearing arrangement formed from a bearing and a connecting pin to have not only one translational degree of freedom but likewise at least one, preferably multiple, rotational degree(s) of freedom.

The fastening apparatus disclosed here may be provided on each side of the pressure vessel. The fastening apparatus may preferably have four connecting pins and four bearings, which are expediently arranged concentrically around the boss. The boss itself is thus easily accessible for any supply lines.

There is a demand to further improve, or actively change, the stiffness of the body by way of the pressure vessel structure.

This is achieved, inter alia, by way of a pressure vessel for a motor vehicle, having a fastening apparatus, the fastening apparatus being designed to connect the pressure vessel to the body of the motor vehicle. Here, the fastening apparatus may have at least one connecting pin which is displaceable relative to the body or relative to the pressure vessel. The connecting pin may, for example, be connected, preferably rigidly, to the pressure vessel or to the body. In particular, the connecting pin may be one of the at least two connecting pins discussed above.

The technology disclosed here furthermore includes at least one fixing mechanism which may be connected to the body or to the pressure vessel (that is to say inversely with respect to the connecting pin; that is to say if the fixing mechanism is connected to the body, the connecting pin is connected to the pressure vessel, and vice versa). The fixing mechanism may be designed to at least temporarily fixedly clamp the connecting pin, and to release the connecting pin at other points in time. It is thus a releasable fixing mechanism.

The fixing mechanism is preferably rigidly or immovably connected to the body or to the pressure vessel. The fixing mechanism may be designed to at least temporarily fixedly clamp the connecting pin when a controller transmits a corresponding control signal. If the remaining degree of freedom in the direction of the longitudinal axis of the connecting pin or of the bearing is likewise blocked, the body is additionally stiffened. At the same time, by way of this regulable fixing mechanism, it is possible for any expansions, such as may arise, for example, as a result of pressure changes or temperature changes in the pressure vessel, to be compensated.

It is particularly preferable for the connecting pin to be guided in the fixing mechanism. The fixing mechanism is preferably simultaneously the guide or bearing arrangement for the connecting pin. In other words, the fixing mechanism may preferably form the bearing discussed above. The fixing mechanism is preferably arranged parallel to the connecting pin. It is preferable for at least two, particularly preferably four, fixing mechanisms or bearings or guides to be provided on each side of the pressure vessel.

The fixing mechanism may be designed to fixedly clamp the connecting pin when the motor vehicle is subject to a dynamics demand above a first threshold value. It is thus possible, for example, for the motor vehicle to be additionally stiffened in the presence of a high dynamics demand. An increased dynamics demand may result, for example, from the road condition and the driving style of the vehicle driver.

The dynamics demand may be determined, for example, from the measurement values of a dynamic stability control (DSC) system. For this purpose, use may be made of sensors (rate of rotation sensors, transverse acceleration sensors, etc.) that are already installed in any case.

The fixing mechanism may be designed to not fixedly clamp the connecting pin when the motor vehicle is subject to a dynamics demand below a first threshold value, for example when the motor vehicle is at rest. If the connecting pin is not fixedly clamped in this state, it is possible for any internal stresses induced by a change of internal pressure or temperature of the pressure vessel to be dissipated again. This may take place in the state of rest without an additional displacement actuator. Moreover, unknown dynamic influences distort the adjustment.

The fixing mechanism may be designed to not fixedly clamp the connecting pin when the pressure vessel is being refilled. When the motor vehicle undergoes tank refilling, the expansion of the vessel changes considerably. If the fixing mechanism were to fixedly clamp the connecting pin, it would be possible for undesired, possibly even damaging loads to be transmitted to the body.

The fixing mechanism is particularly preferably fixed by at least one piezo element. In particular, the at least one piezo element and the fixing mechanism may be designed such that the fixing mechanism prevents the displacement of the connecting pin if no electrical voltage is applied to the piezo element. Such elements can prevent the displacement of the connecting pin in a particularly rapid, inexpensive and precise manner.

The fixing mechanism may be in the form of an electromechanical or hydraulic actuator, in particular in such a way that, by way of a control signal, the electromechanical or hydraulic actuator can at least temporarily fixedly clamp the connecting pin, and can release the connecting pin at other points in time.

In addition to a refinement in which the fixing mechanism merely prevents the displacement, it is also possible for an actuator to be provided which actively adjusts or displaces the connecting pin. It is thus possible for the internal stress or the stiffness of the body to be actively influenced. Depending on the driving mode preselected by the vehicle driver, the body is then made stiffer or softer. It is preferably possible for the electromechanical actuator to be driven by at least one piezo element.

In a particularly preferred refinement, the electromechanical actuator is an inchworm motor. An inchworm motor is a piezoelectric actuator which, in its interior, can move or actuate a shank, in this case the fastening pin, with nanometer precision. For this purpose, the inchworm motor has two gripping regions which are spaced apart from one another in an axial direction by piezo elements and which can firmly grip the fastening pin in alternating fashion and with a short time overlap. After gripping, the piezo elements change their length, whereby the fastening pin is displaced. With such an inchworm motor, it is possible even in the presence of high forces for the connecting pin to be actuated in a highly precise fashion and with continuous traction. Furthermore, the mechanical stress can be measured simultaneously. This thus constitutes an active strut which can positively influence the vehicle characteristics. A further advantage of the inchworm motor is that the traction can be realized at all times.

The technology disclosed here also relates to a motor vehicle having a pressure vessel presented here and having at least one controller. The controller may be designed to release the at least one connecting pin if an operating parameter of the fixing mechanism lies above an operating parameter threshold value. For example, the operating parameter may be the voltage of the actuator (for example piezo element, inchworm motor). The voltage may be representative of the mechanical load to which the pressure tank or the suspension arrangement of the pressure tank is subjected. Depending on the mechanical load, it can then thus be decided by the controller whether the at least one connecting pin is released or fixedly clamped. Such a regulation system can be realized in a particularly simple and precise form.

The controller may furthermore be designed to release the at least one connecting pin if a collision is identified. A collision may be identified, for example, on the basis of further detection systems of the vehicle. Such detection systems are known and are used in conjunction with airbags, for example. If the at least one connecting pin is not fixedly clamped by the fixing mechanism during a collision, it is subject to less mechanical load during the collision event. The amount of damage to the pressure vessel can thus be at least reduced.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
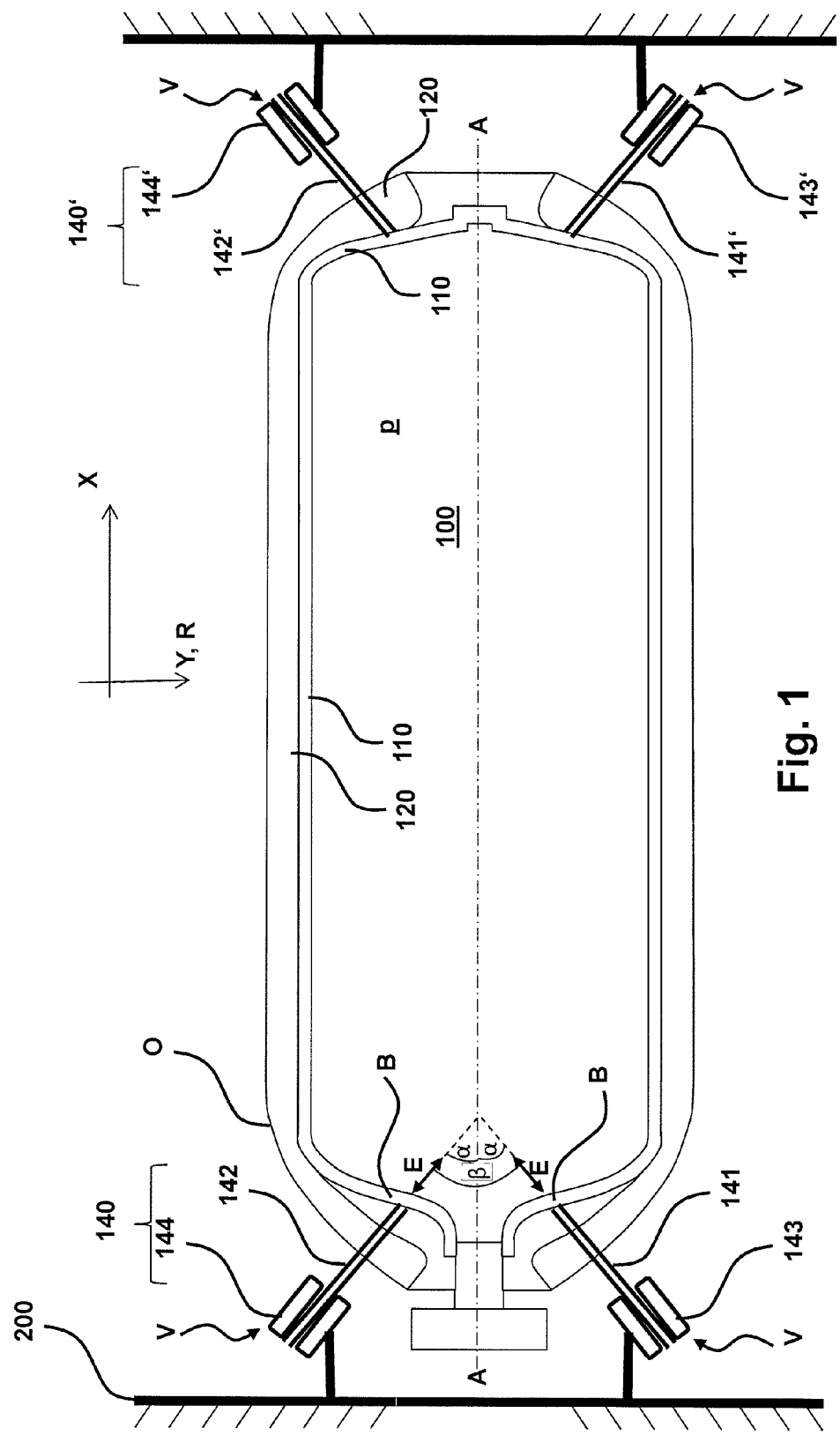
FIG. 1 is a schematic diagram of a pressure vessel in accordance with an embodiment of the invention.

FIG. 1 shows a pressure vessel 100, which in this case is installed in the vehicle longitudinal direction X in the vehicle, for example in the central tunnel. The pressure vessel 100 has a liner 110 and a fiber-reinforced layer 120. At the two sides or ends of the pressure vessel, that is to say at the polar caps, there are provided fastening apparatuses 140, 140' which connect the pressure vessel 100 to corresponding attachment points of the body, for example corresponding transverse members adjacent to the front and rear axle supports. The fastening apparatus 140 may be connected directly or indirectly to the body.

FIG. 1 shows, in each case, two fastening apparatuses 140 on each side. It is particularly preferable for four fastening apparatuses 140 to be provided on each end of the pressure vessel 100. Here, the fastening apparatuses 140 include connecting pins 141, 142; 141', 142' and bearings 143, 144; 143', 144' in which the connecting pins 141, 142; 141', 142' are displaceably guided. The bearings 143, 144; 143', 144' and connecting pins 141, 142; 141', 142' of a fastening apparatus 140, 140' are in this case designed to be collinear. They both run at an angle α with respect to the pressure vessel longitudinal axis A-A. The bearings 143, 144; 143', 144' are directly or indirectly connected fixedly or rigidly to the body 200. The connecting pins 141, 142; 141', 142' are in this case connected to the pressure vessel 100 in a pressure vessel attachment region B. In this case, the connecting pins 141, 142; 141', 142' are led in through the fiber-reinforced layer 120. Other fastening options for the fastening of the connecting pins 141, 142; 141', 142' to the pressure vessel 100 are, however, also contemplated.

The double arrow E symbolizes the pressure vessel expansion in the pressure vessel attachment region B. This expansion or expansion direction E is a reaction of the pressure vessel 100 to changing operating states, substantially to a changing internal pressure p of the pressure vessel 100. The bearings 143, 144; 143', 144' and connecting pins 141, 142; 141', 142' are arranged parallel to the expansion E. If the pressure vessel 100 expands (or contracts) owing to a change in internal pressure, the movement can be accommodated by the collinearly arranged fastening apparatus 140, 140'. Owing to its design and arrangement, the fastening apparatus 140, 140' makes do with only one degree of freedom, namely the displacement along the connecting pin longitudinal axis. The movement possibilities are therefore greatly restricted.

The longitudinal axes of the two fastening apparatuses 140, 140' are arranged at an angle (3, or so as to be angled, with respect to one another. Owing to the fact that the two fastening apparatuses 140, 140' are also rigidly connected to the pressure vessel 100, compensation of the pressure vessel expansion is duly provided, but a translational movement of the pressure vessel 100 as a whole along the longitudinal axes of the fastening apparatuses 140, 140' is prevented. Thus, all possible movements of the pressure vessel 100 are prevented by the fastening apparatus 140, 140'. In other words, a pressure vessel 100 with the fastening apparatus 140, 140' disclosed here can compensate internal pressure-induced expansions and simultaneously transmit forces and moments in all directions in play-free fashion or substantially play-free fashion. The pressure vessel 100 with the fastening apparatus 140, 140' disclosed here can thus transmit forces and moments from a region close to the front axle to a region close to the rear axle, or vice versa. In particular, the fastening apparatus 140, 140' disclosed here is of comparatively simple and space-saving construction. The fastening apparatuses 140, 140' of one side are in this case arranged symmetrically. This, however, need not be the case. For example, it would also be possible for the two fastening apparatuses 140 of the left-hand side to have different angles α (cf. FIG. 3). The fastening apparatuses 140, 140' are preferably arranged concentrically and so as to be slightly spaced apart from the boss of the vessel.

Figure 2:
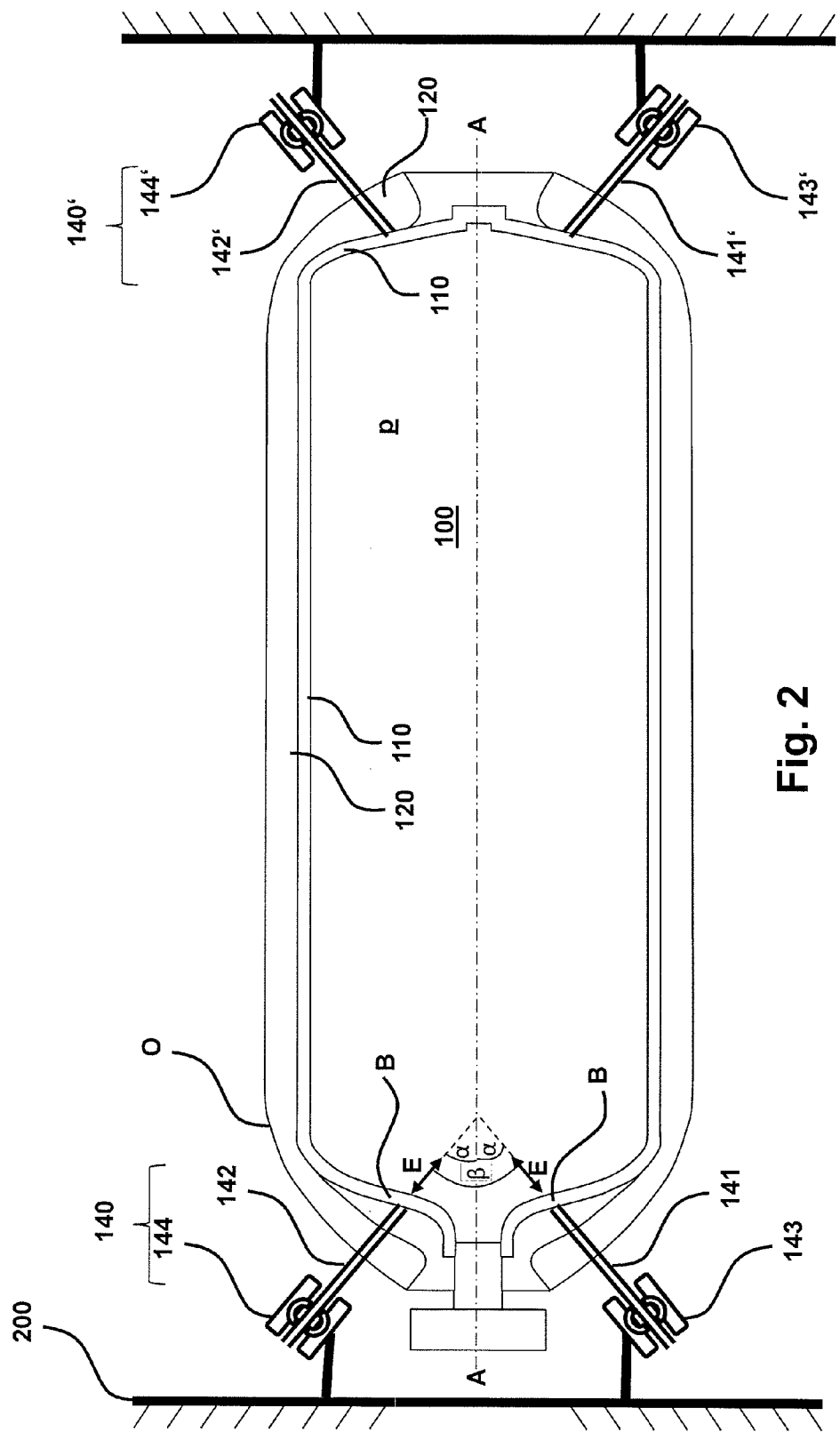
FIG. 2 is a schematic diagram of a pressure vessel similar to FIG. 1, in which the bearings are in the form of ball joints.

FIG. 2 shows a pressure vessel 100 which is substantially identical to that of FIG. 1. Therefore, only the difference will be discussed. The bearings 143, 144; 143', 144' are in this case in the form of ball joints, in which the connecting pins 141, 142; 141', 142' are arranged in displaceable fashion. The ball joints make it possible for the connecting pins 141, 142; 141', 142' to rotate around the central point of the ball joints. The ball joints improve the displaceability of the connecting pins 141, 142; 141', 142'. Since the connecting pins 141, 142; 141', 142' are however clamped at the other end, the fastening apparatuses 140, 140' remain capable of transmitting forces and moments in (substantially) play-free fashion.

Figure 3:
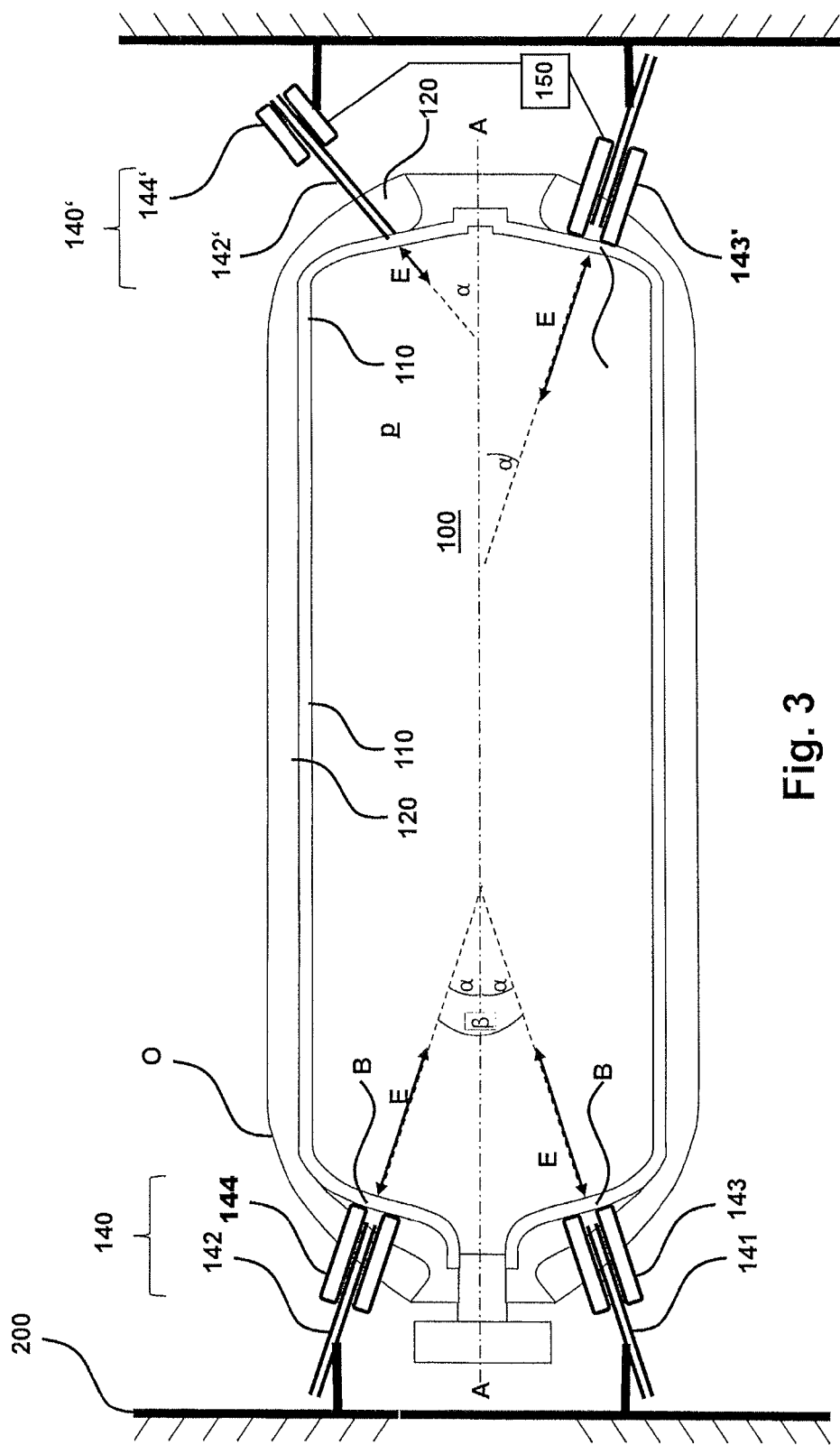
FIG. 3 is a schematic diagram of a pressure vessel similar to FIGS. 1 and 2, in which the bearings and connecting pins are interchangeably located.

FIG. 3 shows a pressure vessel 100 which is substantially identical to those in FIGS. 1 and 2. Therefore, only the differences will be discussed. As shown at the left-hand end of the pressure vessel 100, the arrangement of the bearings 143, 144 and connecting pins 141, 142 may also be interchanged. That is to say, it is also possible for the bearings 143, 144 to be clamped on the pressure vessel 100, and for the connecting pins 141, 142 to be connected to the body 200. In this refinement too, it would be possible for ball joints to be provided. A combination of differently arranged components 143', 144'; 141', 142' of a fastening apparatus 140' at one end of the pressure vessel 100, as is shown for example at the right-hand end in FIG. 3, would self-evidently also be contemplated. In this case, the two ends are of symmetrical form. At the right-hand end, some reference designations have been omitted for the sake of simplicity.

In FIGS. 1 to 3, it is possible for bearings 143, 144; 143', 144', and/or also fixing mechanisms (the fixing mechanism also being generally designated as 143, 144; 143', 144') in addition to the bearings 143, 144; 143', 144', to be provided. The fixing mechanisms preferably guide the connecting pins 141, 142; 141', 142'. The fixing mechanisms or fixing elements are designed to at least temporarily fixedly clamp the connecting pins 141, 142; 141', 142'. It is not imperatively necessary for the fastening apparatuses 140, 140' to run so as to be angled with respect to one another for this purpose. It would also be possible for them to run parallel with respect to one another. This aspect of the technology disclosed here is thus independent of the arrangement of the fastening apparatuses 140, 140'. The fixing mechanisms are thus capable of selectively enabling or blocking at least one degree of freedom, in particular the displaceability along the fastening apparatus longitudinal axis. Thus, scalable stiffness of the body is realized, which can be adapted for example in accordance with the dynamics demand. If the vehicle driver switches into a sport mode, it is possible for the vehicle, via controller 150, to fix the connecting pins 141, 142; 141', 142' by way of the fixing mechanisms, such that forces and moments can be (better) transmitted via the pressure vessel 100. At the same time, the selective fixing makes it possible for any internal pressure-induced pressure vessel deformations to be able to be compensated, without undesired internal stresses arising in the vehicle. In a simple refinement, it is possible for the fixing mechanisms to merely fixedly clamp and release the connecting pins 141, 142; 141', 142'.

In a further refinement, the connecting pins 141, 142; 141', 142' are actively displaced by an electromechanical actuator. In such an embodiment, it is possible for the body stiffness to be adjusted in a precise manner at any time by way of the pressure vessel 100, which is used as an active strut. In particular, piezo elements and inchworm motors are suitable for imparting the possibly high forces for the displacement with the required precision.

The bearings 143, 144; 143', 144' and the connecting pins 141, 142; 141', 142' of a fastening apparatus 140, 140' are of collinear and straight form in FIGS. 1 to 3. This, however, need not be the case. It would likewise be contemplated for the connecting pin 141, 142; 141', 142' to have an S-shaped profile in the region between bearing 143, 144; 143', 144' and pressure vessel attachment region B, and for that section of the connecting pin 141, 142; 141', 142' which is received in the bearing 143, 144; 143', 144' to run parallel to the axis of the expansion E. Such an offset would possibly be advantageous for the transmission of higher moments from the body to the pressure vessel. It would likewise be possible for the expansion E to take place not in straight fashion but in curved fashion. Then, the connecting pin 141, 142; 141', 142' and/or the bearing 143, 144; 143', 144' would, at the connecting point V, be shaped such that it guides said curved expansion E by way of a translational movement with one degree of freedom.

Where the fastening apparatus, connecting pin, bearing, etc. components are referred to here in the singular, this is at the same time also intended to jointly disclose a multiplicity thereof. Furthermore, the technology disclosed here also encompasses a motor vehicle having at least one of the pressure vessels disclosed here and having a controller for controlling the pressure vessel, and possibly for controlling the fixing mechanism.

The above description of the present invention serves merely for illustrative purposes and not for the purposes of restricting the invention. In the context of the invention, various changes and modifications are possible without departing from the scope of the invention and of its equivalents. The aspects relating to the spatial arrangement of the fastening apparatuses 140, 140' relative to the pressure tank 100 are independent of the aspects relating to the fixing mechanisms 143, 144; 143', 144'. The two aspects can therefore also be claimed independently of one another. They are, however, preferably used in combination.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A pressure vessel for a motor vehicle, comprising:
   a fastening apparatus configured to connect the pressure vessel to a body of the motor vehicle, the fastening apparatus having:
      at least one connecting pin which is axially displaceable along a longitudinal axis of the at least one connecting pin relative to the body or relative to the pressure vessel, and
      at least one fixing mechanism which is configured to at least temporarily fixedly clamp the connecting pin.

2. The pressure vessel according to claim 1, wherein the connecting pin is guided in the fixing mechanism.

3. The pressure vessel according to claim 1, wherein:
   the fixing mechanism is configured to fixedly clamp the connecting pin when the motor vehicle is subject to a dynamics demand above a first threshold value, and/or
   the fixing mechanism is configured to not fixedly clamp the connecting pin when the motor vehicle is subject to a dynamics demand below the first threshold value.

4. The pressure vessel according to claim 1, wherein the fixing mechanism is configured to not fixedly clamp the connecting pin when the pressure vessel is being refilled.

5. The pressure vessel according to claim 1, wherein the fixing mechanism includes an actuator.

6. The pressure vessel according to claim 5, wherein the actuator is a piezo element.

7. The pressure vessel according to claim 6, wherein the fixing mechanism is configured such that the fixing mechanism prevents displacement of the connecting pin if no electrical energy is applied to the piezo element.

8. The pressure vessel according to claim 1, wherein the fixing mechanism is an electromechanical actuator.

9. The pressure vessel according to claim 8, wherein the electromechanical actuator is driven by a piezo element.

10. The pressure vessel according to claim 9, wherein the electromechanical actuator is an inchworm motor.

11. The pressure vessel according to claim 8, wherein the electromechanical actuator is an inchworm motor.

12. A motor vehicle, comprising:
   a body of the motor vehicle;
   a pressure vessel, the pressure vessel comprising a fastening apparatus configured to connect the pressure vessel to the body of the motor vehicle, wherein the fastening apparatus has a connecting pin displaceable relative to the body or relative to the pressure vessel and has a fixing mechanism configured to at least temporarily fixedly clamp the connecting pin; and
   a controller configured to control a release of the connecting pin if an operating parameter of the fixing mechanism is above a defined operating parameter threshold value.

13. The motor vehicle according to claim 12, wherein the controller is further configured to control a release of the connecting pin if a collision of the motor vehicle is identified.

14. The motor vehicle according to claim 12, wherein the connecting pin is guided in the fixing mechanism.

15. The motor vehicle according to claim 12, wherein:
   the fixing mechanism is configured to fixedly clamp the connecting pin when the motor vehicle is subject to a dynamics demand above a first threshold value, and/or
   the fixing mechanism is configured to not fixedly clamp the connecting pin when the motor vehicle is subject to a dynamics demand below the first threshold value.

16. The motor vehicle according to claim 12, wherein the fixing mechanism is configured to not fixedly clamp the connecting pin when the pressure vessel is being refilled.

17. The motor vehicle according to claim 12, wherein the fixing mechanism includes an actuator.

18. The motor vehicle according to claim 17, wherein the fixing mechanism is configured such that the fixing mechanism prevents displacement of the connecting pin if no electrical energy is applied to the actuator.

19. The motor vehicle according to claim 12, wherein the fixing mechanism is an electromechanical actuator.

* * * * *